United States Patent [19]

Barker et al.

[11] Patent Number: 5,698,338
[45] Date of Patent: Dec. 16, 1997

[54] SOLID SECONDARY LITHIUM CELL BASED ON $LI_xNI_y CO_{1-y}VO_4$ WHEREIN $0.9<$ OR$=X<$ OR$=1.1$ AND $0<Y<1$ CATHODE MATERIAL

[75] Inventors: Jeremy Barker; M. Yazid Saidi, both of Henderson, Nev.

[73] Assignee: Valence Technology, Inc., Henderson, Nev.

[21] Appl. No.: 616,900

[22] Filed: Mar. 15, 1996

[51] Int. Cl.$^6$ .................................................. H01M 9/48
[52] U.S. Cl. ........................................ 429/223; 429/218
[58] Field of Search ................................ 429/223, 218; 423/593, 596, 64

[56] References Cited

U.S. PATENT DOCUMENTS

| | | | |
|---|---|---|---|
| 4,770,960 | 9/1988 | Nagura et al. | 429/194 |
| 5,069,683 | 12/1991 | Fong et al. | 429/218 |
| 5,427,875 | 6/1995 | Yamamoto et al. | 429/223 |
| 5,478,671 | 12/1995 | Idota | 429/194 |
| 5,478,673 | 12/1995 | Funatsu | 429/197 |
| 5,486,346 | 1/1996 | Fey | 423/594 |
| 5,518,842 | 5/1996 | Fey et al. | 429/218 |

FOREIGN PATENT DOCUMENTS 07-14580   1/1995   Japan.

OTHER PUBLICATIONS

Fey et al., "LiNiVO4: A 4.8 V Electrode Material for Lithium Cells", J. Electrochem. Soc., vol. 141, No. 9, pp. 2279–2282, Sep. 1994.

J. Barker, "Three Electrode Electrochemical Voltage Spectroscopy (TEVS): Evaluation of a Model Lithium System" Electrochim Acta, vol. 40, No. 11 pp. 1603–1606 (no month) 1995.

Primary Examiner—Prince Willis, Jr.
Assistant Examiner—Carol Chaney
Attorney, Agent, or Firm—Charles Jew

[57] ABSTRACT

Non-aqueous lithium solid electrochemical cells with improved performance can be fabricated by employing intercalation based carbon anodes and cathodes comprising $Li_xNi_y CO_{1-y}VO_4$ wherein $0.9 \leq X \leq 1.1$ and $0.1 < y < 0.9$ as the cathode active material.

21 Claims, 3 Drawing Sheets

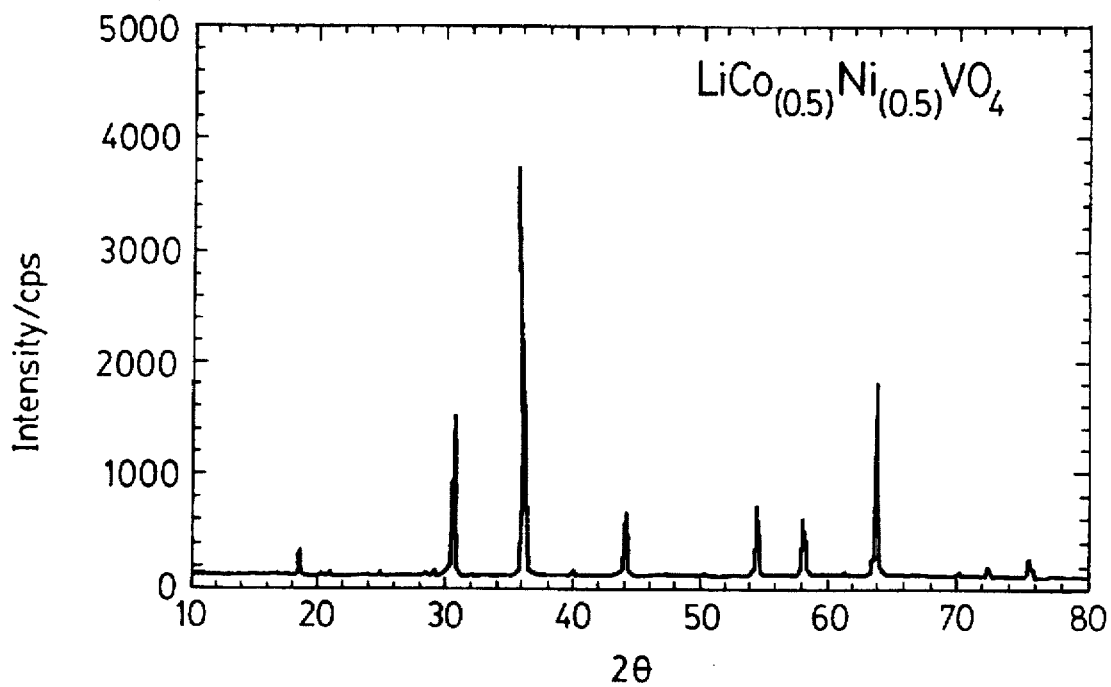
FIG._1.
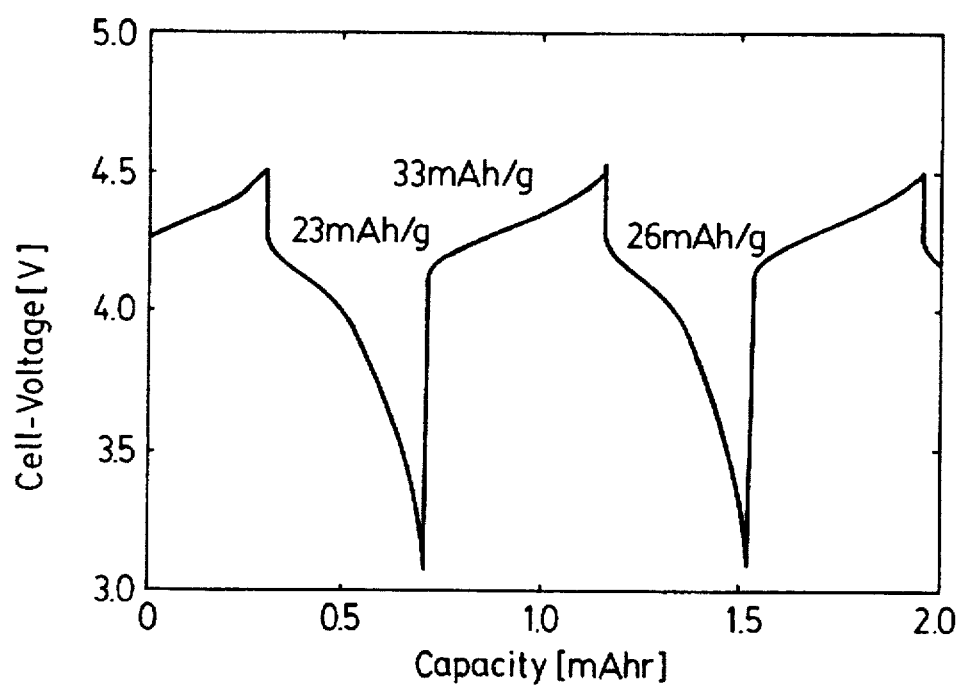
FIG._2.

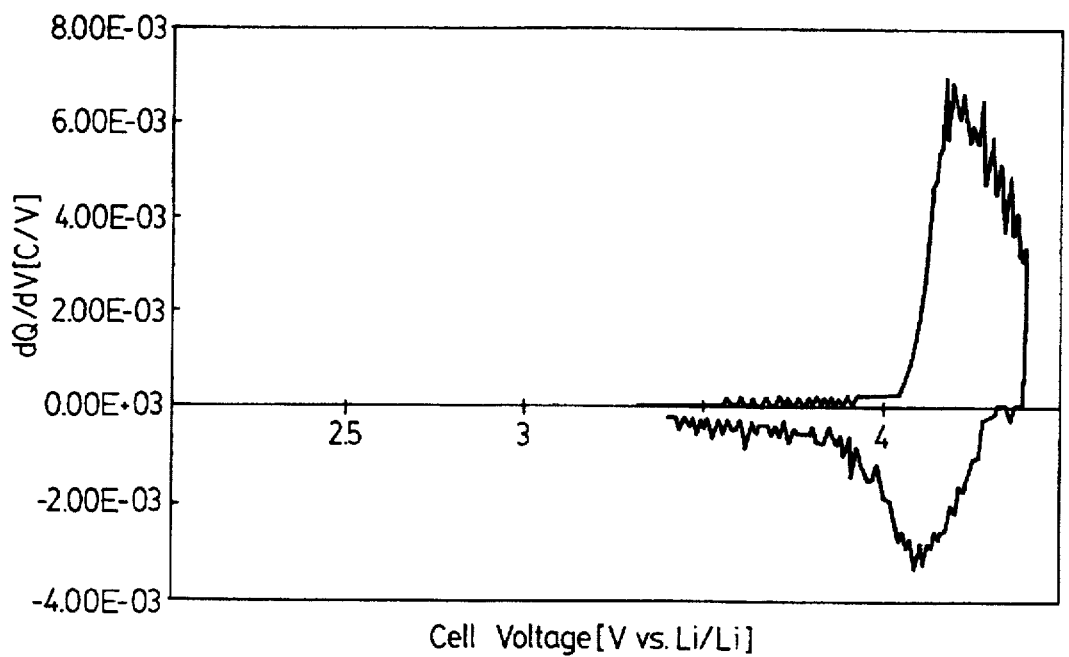
FIG._3.
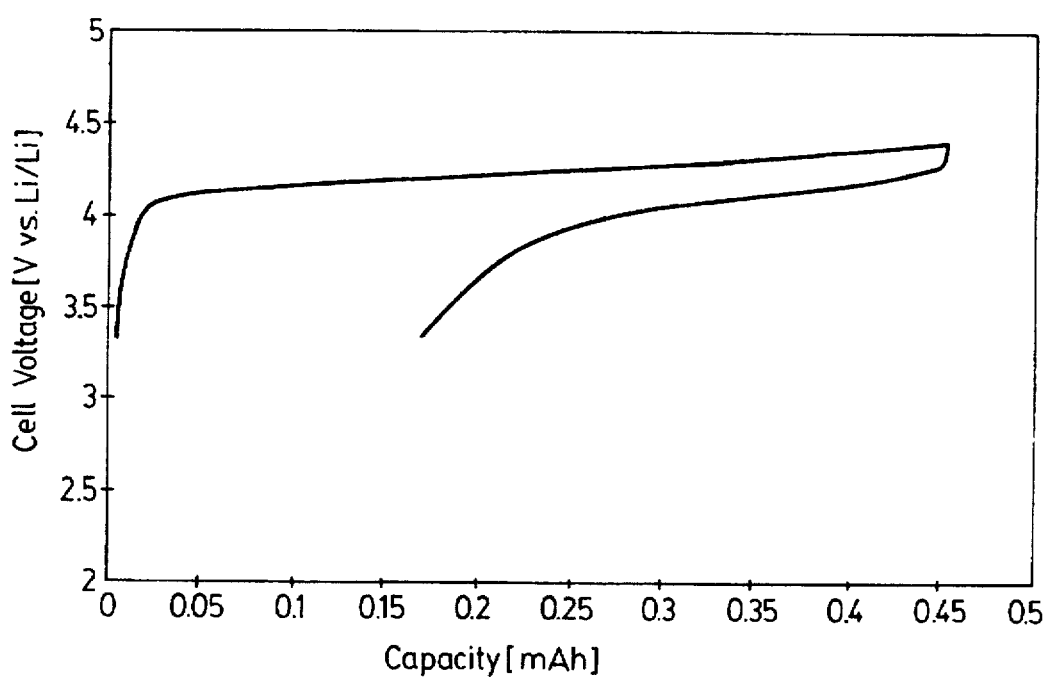
FIG._4.

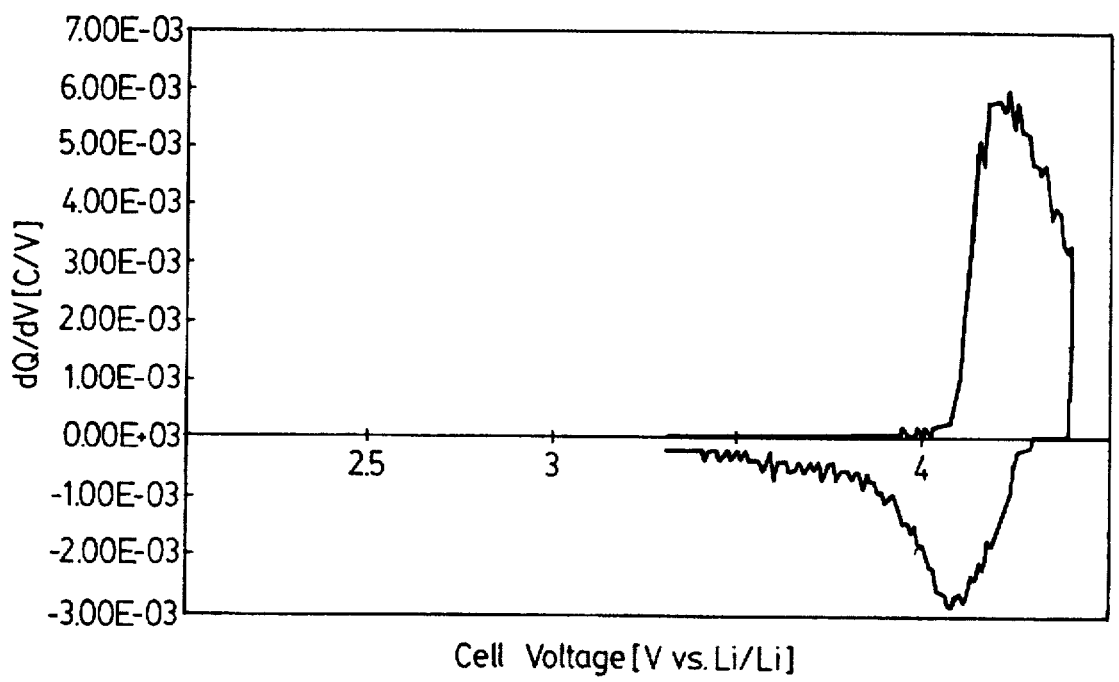
FIG._5.
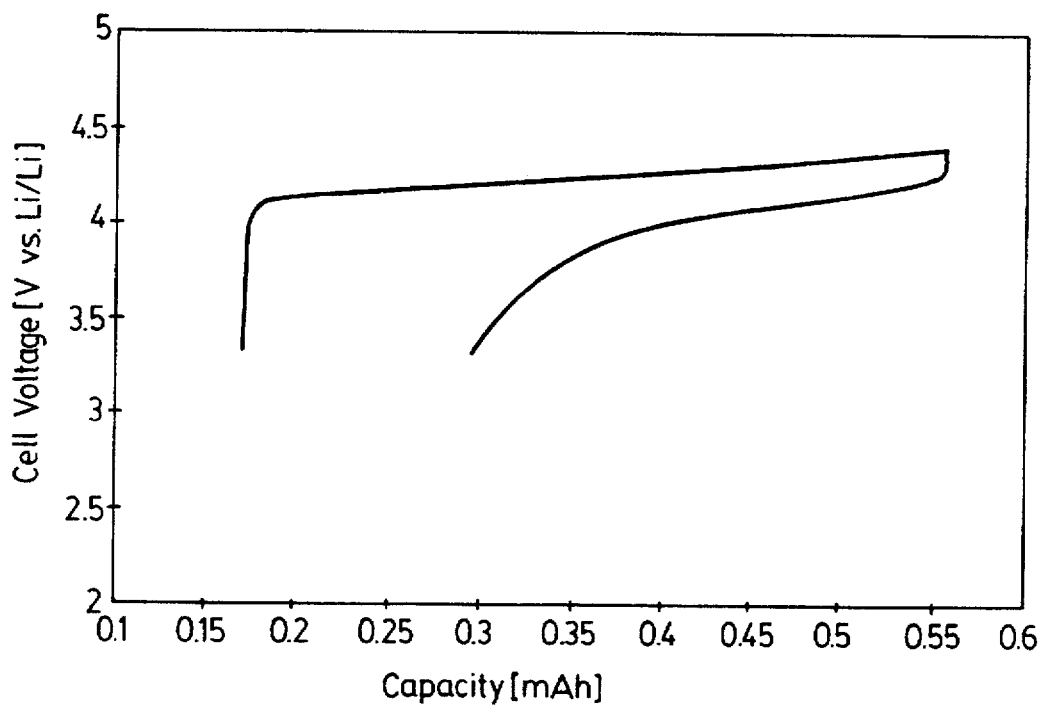
FIG._6.

5,698,338

SOLID SECONDARY LITHIUM CELL BASED ON $Li_xNI_yCO_{1-y}VO_4$ WHEREIN 0.9< OR=X< OR=1.1 AND 0<Y<1 CATHODE MATERIAL

FIELD OF THE INVENTION

The present invention relates to electrochemical devices and, more particularly, provides a lithiated nickel colbalt vanadium oxide as a cathode active material for use in secondary electrochemical cells.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC_6$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500. These cells are referred to as "rocking chair" batteries because lithium ions move back and forth between the intercalation compounds during charge/discharge cycles.

U.S. Pat. No. 4,770,960 reports a lithium liquid electrolyte cell using a cathode active material which is the complex oxide $LiCo_{1-x}Ni_xO_2$ made from calcined mixtures of $Li_2CO_3$, $CoCO_3$ and $NiCO_3$. Furthermore, the discharge capacity decreased with the increase in nickel content for X>0.27. The recommended cathode active materials were those having 0<X ≤0.27. U.S. Pat. No. 5,053,297 discloses cathode active materials which contain as a primary active material a first lithium compound having an electrochemical potential which is more noble than the electrochemical potential of the current collector, and an auxiliary active material which is a second lithium compound having an electrochemical potential which is more base than the electrochemical potential of the current collector. Examples include physical mixtures of $LiNiO_2$ and $LiCoO_2$, as well as, chemical mixtures i.e. $LiNi_{0.95}Co_{0.05}O_2$, for use in lithium liquid electrochemical cells. The electrolyte may alternatively be a gel electrolyte. The addition of auxiliary active material decreases the battery capacity. The preferred anode is a carbon material. European patent application 91119471.0 (Publication 0486950A1) discloses a liquid electrolyte secondary lithium cell having an intercalation carbon anode and a cathode which comprises a lithium-containing metal complex oxide of the formula $Li_xMO_2$, wherein x is $0.5 \leq x \leq 1$ and M is selected from the group Co, Ni and Mn. Examples of the metal complex oxides include $LiCoO_2$, $LiNiO_2$, $LiNi_yCo_{1-y}O_2$, (0<y<1), $LiMn_2O_4$ and mixtures thereof. The cathode active material is ordinarily used in combination with a conductive agent such as graphite and a binder therefor such as polyvinylidene fluoride. The average discharge voltage of the cell is about 3.6 volts., U.S. Pat. No. 5,429,890 discloses a secondary lithium electrochemical cell having a cathode which comprises a physical mixture of $Li_xM_nO_2$ (Spinel) and at least one lithiated metal oxide selected from $Li_xNiO_2$ and $Li_xCoO_2$, wherein 0<x <2. The disclosures of each of the foregoing references is incorporated herein in its entirety.

It is characteristic of the higher capacity intercalation compounds used as active cathode materials that each compound accepts lithium ions at a series of unique voltages. Typically, the discharge curves include a series of inflections. $LiMn_2O_4$ produces voltage plateaus at 4.1 volts, 3.9 volts and 2.9 volts, (versus $Li/Li^+$) on cell discharge. $LiCoO_2$ produces a voltage plateau at 3.7 volts. It would be advantageous if a continuous and smooth voltage profile over a relatively large voltage range could be obtained for the solid lithium cell. Furthermore, it would be highly desirable to tailor the voltage profile to the requirements of the cell and its use.

Potential drawbacks to rocking chair batteries include lower output voltage and energy density compared to lithium metal cells. The use of compounds, which reversibly intercalate lithium at higher voltages, such as, $LiNiO_2$, $LiCoO_2$ and $LiMn_2O_4$, may ameliorate these drawbacks.

SUMMARY OF THE INVENTION

The invention relates to secondary lithium electrochemical cells which includes a solvent-containing polymer matrix that is interposed between an anode and a cathode. More particularly, the invention relates to cathodes and cells in which the cathode active material comprises an intercalation compound having the formula $Li_xNi_yCo_{1-y}VO_4$ wherein $0.9 \leq x \leq 1.1$ and $0<y<1$. Preferably x is about 1.0 and y is about 0.5. One improvement produced by use of the inventive cathode active material is a smooth voltage profile during discharge, substantially without inflections and discontinuities.

In another aspect, the invention relates to a method of synthesizing $Li_xNi_yCo_{1-y}VO_4$ where $0.9 \leq x \leq 1.1$ and $0<y<1$ which process comprises the steps of:

(a) mixing sufficient reactants that comprise $Li_xNiO_2$, $Li_xCoO_2$, and $V_2O_5$ to form the $Li_xNi_yCo_{1-y}VO_4$ in accordance with the following reaction: $y Li_xNiO_2+(1-y)Li_xCoO_2+\frac{1}{2}V_2O_5 \rightarrow Li_xNi_yCo_{1-y}VO_4+\frac{1}{2}O_2$; wherein these reactants are present in stoichiometric proportions based the relative proportion of nickel and cobalt desired in the lithiated nickel cobalt vanadium oxide;

(b) causing the reactants to undergo a solid state reaction to form a reaction mixture comprising the lithiated nickel cobalt vanadium oxide composition by heating the reactants to a temperature sufficient to cause the reactants to anneal; and (c) maintaining the reaction mixture at said temperature for a sufficient amount of time to allow the reactants to further anneal.

BRIEF DESCRIPTION OF THE DRAWINGS

FIG. 1 is the x-ray diffraction pattern for $LiCo_{0.5}Ni_{0.5}VO_4$.

FIG. 2 displays the cell voltage vs. capacity for a $Li/Li_xCo_{0.5}Ni_{0.5}VO_4$ electrochemical cell.

FIG. 3 displays the differential capacity during the first cycle charge and discharge versus cell voltage of a solid, secondary lithium cell composed of a solid electrolyte, a lithium metal anode and a cathode whose cathode active material comprises $LiNi_{0.5}Co_{0.5}VO_4$.

FIG. 4 displays the voltage profile of the cell of FIG. 3 versus the cell capacity over the complete charge/discharge of the first cycle.

FIG. 5 displays the differential capacity during charge and discharge versus cell voltage of the cell of FIG. 3 for the second cycle.

FIG. 6 displays the voltage profile of the cell of FIG. 3 versus the cell capacity over the complete charge/discharge of the second cycle.

DETAILED DESCRIPTION OF THE PREFERRED EMBODIMENTS OF THE INVENTION

The present invention is directed to a method of preparing electrodes suitable for use in electrochemical devices particularly electrochemical cells. Specifically, the novel cathode active material is an intercalation compound having the formula $Li_xNi_yCo_{1-y}VO_4$ wherein $0.9 \leq x \leq 1.1$ and $0<y<1$ and which has a stable inverse spinel structure. It is synthesized by the reaction of lithium nickel dioxide, lithium cobalt dioxide, and vanadium pentoxide in accordance with the following reaction: $y\ Li_xNiO_2 + (1-y)Li_xCoO_2 + \frac{1}{2}V_2O_5 \rightarrow Li_xNi_yCo_{1-y}VO_4 + \frac{1}{2}O_2$.

Generally, the reactants are heated to a sufficient temperature to cause the reactants to anneal. In a preferred method, the reaction is carried out in the solid state by thoroughly mixing the powdered reactants in a suitable solvent (e.g., methanol or acetone) for 30 minutes. The powdered sample is then pelletized (with removal of the solvent) and placed in an alumina crucible. The temperature of the mixture is raised slowly at a rate of about 1° to 5° C./min. to 680° C. and held at that temperature for 6 hours. Thereafter the temperature is raised to 750°–850° C. and held for a sufficient time to allow the reaction to proceed (e.g., about 24 hours). The composition is allowed to cool slowly to room temperature before it was crushed and reground. Again pellets are made and reheated at about 5° C./min. to 850° C. for another 24 hrs. The process can be repeated until no significant trace of starting materials are present. The powder final product, after being ground to particles ranging from about 5 to 15 μm in size, may be used directly in the construction of a cathode for a solid electrochemical cell.

The cathode used in the cell of the present invention employs as its cathode active material $Li_xNi_yCo_{1-y}VO_4$ wherein $0.9 \leq x \leq 1.1$ and $0.1 \leq y \leq 0.9$, preferably x is about 1.0 and y is about 0.5. Furthermore, the operation voltage of the cell is preferably about 3 to about 5V, more preferably about 3.5 to about 4.5V, and most preferably about 3.75 to about 4.25V. It is expected that increasing the percentage of nickel (relative to cobalt) in the compound, that is, increasing the value of y will have the effect of raising the operating voltage of the cell. During operation of the cell or battery, the lithium ions will move in and out of the cathode active material so that in the lithiated nickel cobalt vanadium oxide during charge/discharge can be represented by the formula $Li_zNi_yCo_{1-y}VO_4$ where $0 \leq z \leq 1$.

$LiNiO_2$ can be synthesized by mixing NiO and $Li_2CO_3$ and reacting the mixture in an oxidizing atmosphere at about 800° C. Similarly, $LiCoO_2$ can be synthesized by mixing $CoCO_3$ and $Li_2CO_3$ and reacting the mixture in an oxidizing atmosphere at about 750° C. $LiNi_yCo_{1-y}VO_4 (0 \leq y<1)$ has a predominantly inverse spinel structure. Inverse spinel structures are described in Fey et. al, *J. Electrochem. Soc.*, Vol. 141, No. 9, 1994, 2279–2282, which is incorporated herein.

In synthesizing $LiNi_{0.5}Co_{0.5}VO_4 (x=1)$, the reactants are preferably $Li_xNiO_2$ and $Li_xCoO_2$ which can be prepared by standard procedures known in the art as described, for example, in Fey et. at. Generally, these starting materials can be made by admixing NiO and $Li_2CO_3$ in the case of $LiNiO_2$, and $CoCO_3$ and $Li_2CO_3$ in the case of $LiNiO_2$ in sufficient amounts to produce $Li_xNiO_2$ and $Li_xNiO_2$ where $0.9 \leq x \leq 1.1$.

The cathode active material of the present invention may be mixed or diluted with any other cathode active material, electronically conducting material, solid electrolyte or compatible inert material. The cathode is readily fabricated from individual or mixed cathode active materials described therein.

Preferred electrochemical cells include: a cathode comprising as the active material, an intercalation based carbon anode, with each electrode capable of reversibly incorporating (e.g., intercalating) an alkali metal ion, and a polymeric matrix containing an electrolyte solution comprising, an organic electrolyte solvent and a salt of the alkali metal. Each electrode preferably has a current collector. The electrochemical cells and batteries use lithium and salts thereof.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

The anode and cathode each also includes a current collector that comprises, for example, a screen, grid, expanded metal, woven or non-woven fabric or knitted wire formed from an electron conductive material such as metals or alloys. Particularly preferred current collectors comprise perforated metal foils or sheets. Preferably, the current collector has a thickness from about 25 μm to about 75 μm, preferably about 35 μm to about 65 μm, and more preferably about 45 μm to about 55 μm. In order to minimize the weight of the electrochemical cell, thin current collectors are preferred. It is expected that current collector having a thickness of about 12.5 μm can be employed. Each current collector is also connected to a current collector tab which extends from the edge of the current collector. The current collector tab is integral to the current collector. By integral is meant that the body of the current collector and tab form a unit, that is, they are not separate members that are attached (e.g., welded) together. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability, liquid solvents, e.g., diethyl ether, or dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent(s). Upon casting the solution, the solvent is evaporated to form the solid polymeric matrix. The solution may be casted directly onto a current collector. Alternatively, the solution is cast onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, LiSCN, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. The cathode includes the lithiated nickel cobalt vanadium oxide of the present invention but may also include other cathodic material(s) which may include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a MnSO₄ solution and (NH₄)₂S₂O₈ as an oxidizing agent.

Lithiation (also referred to as "prelithiation") of αMnO₂ can be accomplished via a solid state reaction:

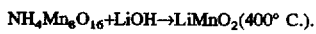
$NH_4Mn_8O_{16} + LiOH \rightarrow LiMnO_2 (400° C.)$.

Li-α-MnO₂ retains the same structure as Hollandite. See, Botkovitz et. al., J. of Power Sources, 43–44 (1993) 657–665, which is incorporated herein, for a discussion of the structure and electrochemical characteristics of Li-α-MnO₂. Li$_y$-α-MnO₂ $0 \leq y < 0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive cathode active material can be adapted to form cathode structures in prior art electrochemical cells. Example 1 describes the synthesis of LiNi$_{0.5}$Co$_{0.5}$VO$_4$. Examples 2 and 3 describe the process of preparing the anode and cathodes, respectively. Example 4 describes the procedures for fabricating a solid electrolytic cell.

The invention will be described using the anode and cathode structures wherein films (i.e., electrode materials) are laminated on both surfaces of the current collectors, however, it is understood that the invention is applicable to other configurations, for instance, where only one surface of the anode and/or cathode current collector is laminated.

EXAMPLE 1

Stoichiometric amounts of LiNiO₂ and LiCoO₂ and V₂O₅ in powdered form were intimately mixed together for 30 minutes. Then pellets were made from the powder to ensure better reaction. The pellets were placed in a chamber containing air and then heated to raise the temperature 2° C./min until 750° C. This temperature was maintained for 24 hrs. The pellets were then reground and the heating procedure repeated for another 24 hrs.

The composition of the product was confirmed by the weight difference between the reactants and the product. The product was also analyzed for lithium content by atomic absorption potentiometric titration and thermogravimetric analysis. The final product was LiNi$_{0.5}$Co$_{0.5}$VO$_4$. The powder x-ray diffraction pattern of the product is given in FIG. 1 and shows that the product is a single phase with no detectable impurities.

EXAMPLE 2

The anode current collector employed was a sheet of expanded copper metal that is about 50 μm thick. It is available under the designation 2Cu5-125 (flatten) from Delker, Corp. in Branford, Conn. The anode slurry was prepared as follows:

A polymer mixture comprising a copolymer of vinylidene difluoride (VDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes. (Optionally, a surfactant can be added to the graphite mixture to facilitate dispersion of the graphite. Preferred surfactants include Pluronic FC68™ from BASF, Mt. Olive, N.J. and Flurad 430™ from 3M Co. St. Paul, Minn.).

The anode slurry was prepared by mixing the polymer mixture and the graphite mixture together under low shear conditions to form the anode slurry wherein the components are well mixed. A portion of the acetone is allowed to evaporate from the slurry before it was laminated onto the current collector. Anode films form when the remaining portion of the acetone evaporates.

EXAMPLE 3

The cathode current collector employed was a sheet of expanded aluminum that is about 50 μm thick. The aluminum grid is available under the designation 2AL5-077 from Delker. The cathode slurry was prepared as follows:

A polymer mixture comprising a copolymer of vinylidene difluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of $LiNi_{0.5}Co_{0.5}VO_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed. (Optionally, a surfactant can be added to facilitate dispersion.)

The cathode slurry was prepared by mixing the polymer mixture and the cathode mixture together under low shear conditions to form the cathode slurry wherein the components are well mixed. A portion of the acetone is allowed to evaporate from the slurry before it was laminated onto the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the metal sheet.

EXAMPLE 4

A solid electrochemical cell is prepared by first positioning a polymeric matrix between the anode and cathode and thereafter fusing the structures under moderate pressure and temperature (e.g., 130° C.) to form an electrochemical cell precursor. The pressure and temperature will depend on the polymer(s) forming the polymer matrix. The polymeric matrix is formed by casting a polymeric slurry comprising acetone, dibutyl phthalate, silanized fumed $SiO_2$, and the VDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} = 1.0.$$

Next the dibutyl phthalate plasticizer is extracted from the precursor. Extraction can be accomplished using conventional organic liquid solvents such as diethyl ether or by supercritical fluids which includes, for example, a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXPERIMENTAL

Electrochemical cells wherein the cathode comprised the inventive lithiated nickel cobalt vanadium oxide and the anode comprised lithium metal were tested. Specifically, the cathode comprised $LiNi_{0.5}Co_{0.5}VO_4$ and EPDM as the binder and the cathode slurry was prepared as follows. The cathode slurry was prepared by combining sufficient cathode powder to provide for a final product having about 51.7 weight percent the $Li_xNi_yCo_{1-y}VO_4$. The slurry contains the following (in approximate weight percent):

| | |
|---|---|
| $Li_xNi_yCo_{1-y}VO_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $Li_xNi_yCo_{1-y}VO_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $Li_xNi_yCo_{1-y}VO_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

The electrolyte solvent comprised a mixture of ethylene carbonate and dimethyl carbonate (67:33 ratio by weight) and 1M LiPF$_6$. A separator comprising glass fibers was employed. The anode, cathode, and separator of the electrochemical cell each had a geometrical area of approximately 2.4 cm$^2$. Data shown in FIGS. 3–6 were derived from electrochemical voltage spectroscopy (EVS) studies. EVS techniques are further discussed in J. Barker Electrochimica Acta, Vol. 40, No. 11 (1995) 1603–08, which is incorporated. The tests were conducted with constant current cycling at 0.2 mA/cm$^2$ and the voltage limits were about 3.0 volts and about 4.5 volts.

FIG. 2 shows the evolution of the voltage profile for a Li/Li$_x$Ni$_{0.5}$Co$_{0.5}$VO$_4$ cell as a function of total cell capacity. From FIG. 2, the second discharge specific capacity was calculated to be 29 mAh/g; the subsequent charge specific capacity was 33 mAh/g, and the next discharge specific capacity was 26 mAh/g.

FIG. 3 displays the differential capacity during the first cycle charge and discharge versus cell voltage of the electrochemical cell. The EVS data above the voltage axis represent cell charge and data below the voltage axis represent cell discharge. The experimental parameters were: 10 mV voltage steps and critical limiting current density of 50 μA/cm$^2$. The reversible capacity for the LiNi$_{0.5}$Co$_{0.5}$VO$_4$ of FIG. 3 was about 35 mAh/g.

FIG. 4 displays the voltage profile of the cell vs. the capacity over the first complete charge/discharge cycle.

FIG. 5 displays the differential capacity during the second cycle charge and discharge versus cell voltage of the electrochemical cell. The experimental parameters were: 10 mV voltage steps and critical limiting current density of 50 μA/cm$^2$. FIG. 6 displays the voltage profile of the cell vs. the capacity over the second complete charge/discharge cycle.

In general, the above data demonstrate that the inventive lithiated nickel cobalt vanadium oxide has reversible capacity at high potential. Hence the cathodes employing the compound can be used in lithium ion electrochemical cells.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A secondary electrochemical cell which comprises:
   a solvent containing electrolyte interposed between an anode composed of anodic material and cathode composed of cathodic material wherein said electrolyte comprises an inorganic ion salt and a solid polymeric matrix and wherein said cathodic material comprises Li$_x$Ni$_y$Co$_{1-y}$VO$_4$ wherein $0.9 \leq x \leq 1.1$ and $0.1 \leq y \leq 0.9$.

2. A secondary electrochemical cell according to claim 1 wherein said cell has an operating voltage of about 3 to about 5 volts.

3. A secondary electrochemical cell according to claim 1 wherein said cell has an operating voltage of about 3.75 to about 4.25 volts.

4. A secondary electrochemical cell according to claim 3 wherein y is about 0.5.

5. A secondary electrochemical cell according to claim 1 wherein said anode comprises a carbon material selected from carbon black, coke, graphite, and mixtures thereof.

6. A secondary electrochemical cell according to claim 1 wherein said anode comprises an intercalation carbon anode.

7. A secondary electrochemical cell according to claim 1 wherein y is about 0.5.

8. A secondary electrochemical cell according to claim 1 wherein x is about 1.

9. A composite cathode comprising a lithiated nickel cobalt vanadium oxide composition, a polymeric binder, and a carbon, wherein the lithiated nickel cobalt vanadium oxide has the formula Li$_x$Ni$_y$Co$_{1-y}$VO$_4$ wherein $0.9 \leq x \leq 1.1$ and $0.1 \leq y \leq 0.9$.

10. The composite of claim 9 wherein the lithiated nickel cobalt vanadium oxide is prepared by a process comprising the steps of:
   (a) mixing sufficient reactants that comprise Li$_x$NiO$_2$, Li$_x$CoO$_2$, and V$_2$O$_5$ to form the Li$_x$Ni$_y$Co$_{1-y}$VO$_4$ in accordance with the following reaction: y Li$_x$NiO$_2$+(1−y)Li$_x$CoO$_2$+½V$_2$O$_5$→Li$_x$Ni$_y$Co$_{1-y}$VO$_4$+ ¼O$_2$; wherein these reactants are present in stoichiometric proportions based the relative proportion of nickel and cobalt desired in the lithiated nickel cobalt vanadium oxide;
   (b) causing the reactants to undergo a solid state reaction to form a reaction mixture comprising the lithiated nickel cobalt vanadium oxide composition by heating the reactants to a temperature sufficient to cause the reactants to anneal; and
   (c) maintaining the reaction mixture at said temperature for a sufficient amount of time to allow the reactants to further anneal.

11. The composite cathode of claim 10 wherein step (b) comprises heating the reactants to cause the temperature to rise at a rate of 1° to 5° C. per minute.

12. The composite cathode of claim 1 wherein step (b) comprising heating the reactants to a temperature of about 750° C.

13. A secondary electrochemical cell comprising an anode, a cathode, and interposed therebetween a solid electrolyte comprising a solid polymeric matrix, a solvent electrolyte, and an inorganic salt, wherein the cathode comprises a lithiated nickel cobalt vanadium oxide has the formula Li$_x$Ni$_y$Co$_{1-y}$VO$_4$ wherein $0.9 \leq x \leq 1.1$ and $0.1 \leq y \leq 0.9$.

14. The secondary electro-chemical cell of claim 13 wherein the lithiated nickel cobalt vanadium oxide is prepared by a process comprising the steps of:
   (a) mixing sufficient reactants that comprise Li$_x$NiO$_2$, Li$_x$CoO$_2$, and V$_2$O$_5$ to form the LiNi$_y$Co$_{1-y}$VO$_4$ in accordance with the following reaction: y Li$_x$NiO$_2$+(1−y)Li$_x$CoO$_2$+½V$_2$O$_5$→Li$_x$Ni$_y$Co$_{1-y}$VO$_4$+ ¼O$_2$; wherein these reactants are present in stoichiometric proportions based the relative proportion of nickel and cobalt desired in the lithiated nickel cobalt vanadium oxide;

(b) causing the reactants to undergo a solid state reaction to form a reaction mixture comprising the lithiated nickel cobalt vanadium oxide composition by heating the reactants to a temperature sufficient to cause the reactants to anneal; and (c) maintaining the reaction mixture at said temperature for a sufficient amount of time to allow the reactants to further anneal.

15. A secondary electrochemical cell of claim 14 wherein step (b) comprises heating the reactants to cause the temperature to rise at a rate of 1° to 5° C. per minute.

16. A secondary electrochemical cell of claim 14 wherein step (b) comprising heating the reactants to a temperature of about 750° C.

17. A secondary electrochemical cell according to claim 14 wherein said cell has an operating voltage of about 3 to about 5 volts.

18. A secondary electrochemical cell according to claim 14 wherein said cell has an operating voltage of about 3.75 to about 4.25 volts.

19. A secondary electrochemical cell according to claim 14 wherein y is about 0.5.

20. A lithiated nickel cobalt vanadium oxide having the formula $Li_xNi_yCo_{1-y}VO_4$ wherein $0.9 \leq x \leq 1.1$ and $0.1 \leq y \leq 0.9$.

21. The lithiated nickel cobalt vanadium oxide according to claim 20 wherein y is about 0.5.

* * * * *